Patented Aug. 10, 1937

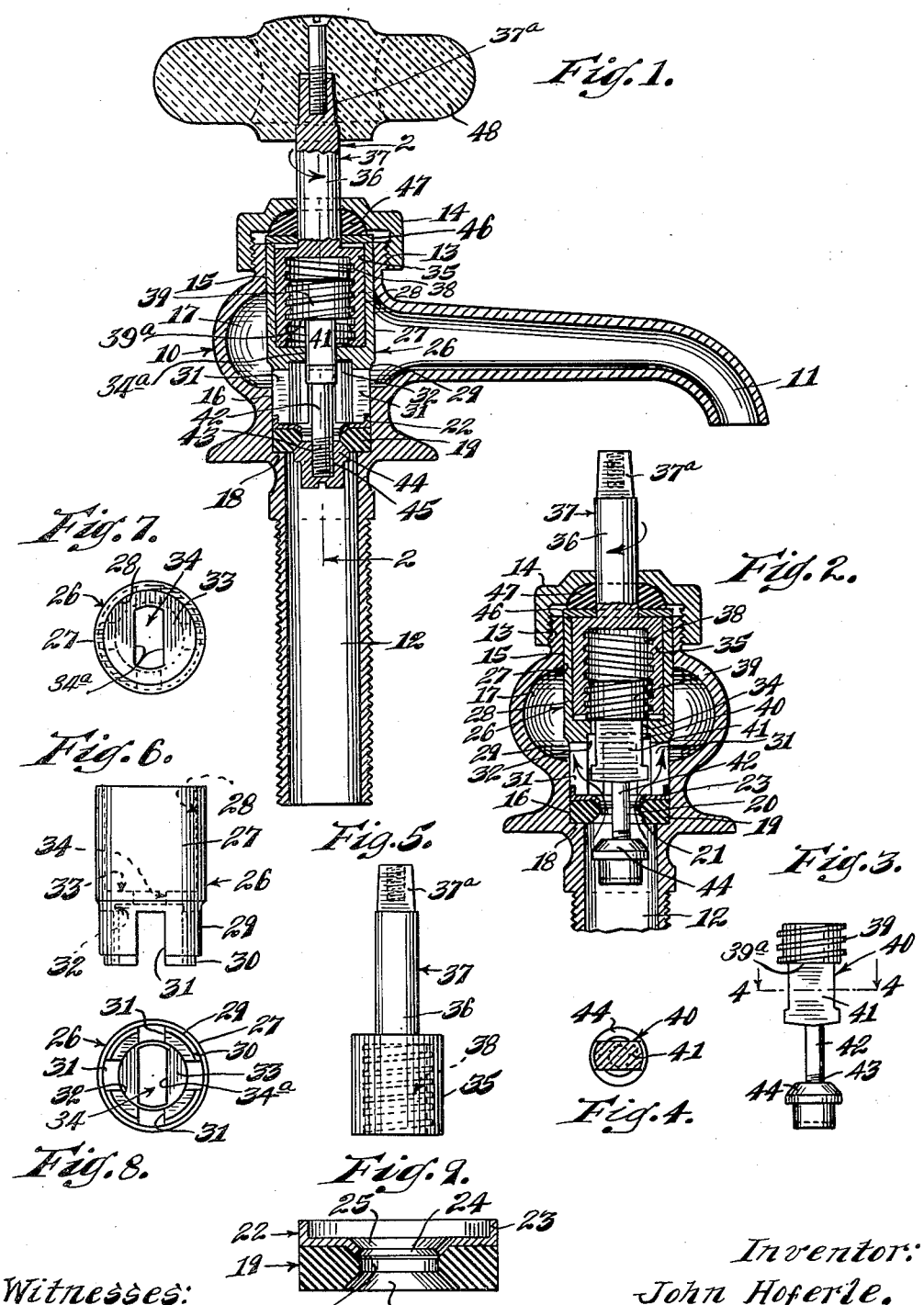

2,089,848

UNITED STATES PATENT OFFICE 2,089,848

FAUCET

John Hoferle, Chicago, Ill.

Application February 14, 1935, Serial No. 6,416

7 Claims. (Cl. 251—156)

This invention relates to faucets and the like, and particularly to valves for faucets and the like.

An object of my invention has been to provide an improved valve, particularly a valve for faucets and the like, whereby wear of parts will be reduced substantially and to a minimum. More particularly, an object among others of my invention is to eliminate much repair heretofore necessitated by faucets by providing a faucet valve structure in which the valve reciprocates and does not turn on the washer. It is a well known fact that the turning action between valves and valve seats in faucet structures makes washers relatively short-lived and causes frequent necessity for changes and repairs in parts. By the means which I have provided the life of the parts may be immeasurably and infinitely lengthened.

Another object of my invention has been to provide a valve structure affording a simpler and more efficient opening and closing action.

It is also a fact that many faucets are not closed properly, either because of carelessness or for other reasons, and another object of my invention among others is to provide a valve which will close effectively and completely so that if the valve is not quite fully closed, the same will be caused to close automatically, whereby leakage and other disadvantages will be eliminated.

Another object of my invention has been to provide a structure of the kind described which may be adapted to standard faucet bodies, and still another object has been to provide such a structure so that it will be simple to construct and operate and inexpensive in the cost of production.

Other objects will appear hereinafter.

My invention will be best understood by reference to the accompanying drawing, in which:

Fig. 1 is a vertical sectional view of a faucet with a form of my invention applied;

Fig. 2 is a detail vertical sectional view taken on the line 2—2 of Fig. 1;

Fig. 3 is an elevational view of the reciprocating valve member;

Fig. 4 is a sectional view taken on the line 4—4 of Fig. 3;

Fig. 5 is an elevational view of the valve actuating stem;

Fig. 6 is an elevational view of the bushing;

Fig. 7 is a top plan view of the bushing;

Fig. 8 is a bottom plan view of the bushing; and

Fig. 9 is an enlarged cross sectional view of the valve seat body member and its superimposed disk.

The preferred form which has been selected for the purpose of illustrating the principles of my invention is shown as comprising a complete and self-contained valve unit that may be applied to a conventional and generally standard type of faucet body or housing 10, having a spout or outlet 11, an inlet pipe extension 12, and a threaded neck 13 for the usual nut 14. The housing 10 includes an outer bore 15 and an inner bore 16 of similar diameter, and between these bores is a fluid chamber 17 which is of greater diameter than the bores and communicates with the outlet 11. At the lower end of the inner bore 16 and adjacent the mouth of the inlet pipe, the housing 10 has a valve seat shoulder 18 which faces away from the direction of fluid flow.

Referring particularly to Figs. 1, 2, and 9, the valve unit includes at its inner end a valve seat member 19 which may be a washer of any suitable kind and is adapted to abut the shoulder 18. This valve seat may be of yieldable material such as soft or hard rubber, compressed fibre or any synthetic material that will insure a long life, and the opposite faces of the valve seat may be of similar construction to assure correct assembly and permit reversal of the seat should it become worn after a long period of use. The valve seat 19 has a fluid-admitting aperture 20 and may have a bevel 21 surrounding the aperture as shown in Fig. 9. In order to maintain one face of the valve seat 19 firmly in engagement with the shoulder 18, the inner end of the unit may be provided with rigid abutment means. As shown herein, a valve seat disk element 22 having a cylindrical marginal flange 23 may be disposed in abutting relation to the opposed face of the valve seat. The disk is provided with an opening 24 which registers with the aperture 20 in the valve seat 19, and may have a flaring lip or reinforcing flange 25 about the opening 24 engageable with the margin defining the aperture 20 in the valve seat.

Referring to Figs. 1 and 2, and particularly to Figs. 6, 7, and 8, the improved valve unit includes a hollow cylindrical body 26 which is smooth-walled and free of internal or external threads and is adapted to fit axially within the housing 10. In the preferred form, the body 26 comprises an outer end section 27 which has a cylindrical bore or chamber 28 and is adapted to fit relatively closely but slidably within the bore 15 of the housing 10. On its lower or inner end the body 26 has a portion 29 of reduced diameter which terminates in an offset portion 30 that provides a rabbet groove within which the cylindrical flange 23 of the valve seat disk element 22 is snugly received. The reduced portion 29 has a plurality of radially disposed longitudinal slots 31 communicating with a bore or chamber 32 therein. The valve unit body 26 at the meeting of the large and reduced portions 27 and 29 is provided with a transverse division wall or web 33 (Figs. 7 and 9) having an aperture 34 which is angular, in the sense that it is otherwise than cylindrical. This aperture communicates with the chambers 28 and 32, and provides opposed parallel walls 34a adapted for a purpose to appear more fully hereinafter.

Located in the chamber 28 in the outer section 27 is a hollow, cylindrical head 35 which may be slightly shorter than the chamber 28 and which carries a valve actuating stem 36 that may, if desired, be formed integrally with the outer end of the head. The valve actuating stem forms part of a valve actuating member 37 and has tapered faces 37a at its outer end, shown particularly in Fig. 5, and serving a purpose to be described.

Means is provided for opening or closing the valve unit by rotating the head 35. To this end, the head may be provided with internal threads 38 which are adapted to register with external threads 39 on the upper end of a reciprocable valve member or shaft 40 which is shown in detail in Figs. 3 and 4. The reciprocable shaft 40 has a flattened guide portion 41 which may be of angular cross section to extend through and register slidably with the walls 34a defining the aperture 34 in the web 33. Coaction between shoulders or stops 39a, on the inner end of the threaded portion 39 adjacent the sides of the guide portion 41 and the web 33, serves to limit inward movement of the reciprocating member. At the end of the guide portion 41 opposite the threaded part 39, the reciprocating shaft 40 has a rounded shank portion 42 of reduced diameter which is adapted to extend coaxially through the openings 20 and 24 in the valve seat and disk elements, respectively. Upon its lower or free end, the shank 42 may be provided with threads 43 to receive a valve member 44 having a threaded bore 45. In order to assure proper seating of the valve member 44 in liquid sealing relation with the seat 19, the face of the valve member adjacent the shank 42 may be more or less tapered and of substantially greater diameter than the aperture 20 in the valve seat.

For the purpose of confining the head 35 closely within the outer chamber 28 of the valve unit, while permitting free rotational movement and slight longitudinal movement of the head within the chamber, a flat, rigid apertured washer 46 may be fitted about the operating stem 36 and secured by the nut 14 in abutment with the outer end of the body 26. With this relationship of parts the extent of inward movement of the head is determined by contact of its inner end with the web 33, and outward movement of the head is limited by abutment with the washer 46 to a very short range away from the web, for a purpose to be more fully described. To prevent leakage past the stem 36, suitable sealing means such as packing 47 may be disposed about the stem and clamped between the outer face of the washer 46 and the inner face of the nut 14, the latter being suitably chambered for the purpose. At its outer end, the stem 36 may carry the usual valve operating handle 48 which is secured in coacting relation to the tapered faces 37a to maintain the handle against rotation relative to the stem.

In assembling the parts of the improved valve unit, the disk element 22 is secured against the inner shouldered end of the body 26, and the reciprocating shaft 40 may then be inserted into the outer chamber 28 of the body with the flattened guide portion 41 within the web slot 34 and the shank 42 extending through the opening 24 in the disk element. Following this, the valve seat 19 may be placed in cooperation with the disk element 22, and the valve member 44 may thereafter be threaded onto the outer end of the shank 42, thus permanently uniting all of the parts thus far assembled. Then, the head 35 may be placed in threaded engagement with the threaded portion 39 of the reciprocating shaft, after which the washer 46, the packing 47 and the nut 14 may be placed and secured around the operating stem 36 and the handle 48 secured to the outer end of the stem. The whole assembly may then be inserted into the housing 10 with the valve seat 19 abutting the shoulder 18 and closely coacting with the wall of the inner bore 16. In this position, substantial peripheral portions of the walls of the inner and outer sections 28 and 29 will cooperate in slidable relation with the walls of the bores 15 and 16, respectively. After the nut 14 has been tightened down on the threads 13, the valve housing will be thoroughly sealed against the escape of liquid and the flow of liquid therethrough may be controlled as desired by operation of the valve unit.

With respect to the operation of the device, Fig. 1 shows the valve in closed condition. In order to open the valve the handle may be turned in a counterclockwise manner, and the parts will change to the condition shown in Fig. 2. Conversely, to close the valve the handle may be turned in a clockwise manner.

In operation, the only part which turns in the entire valve unit is the valve operating member 37. When the handle is turned, this causes the valve actuating stem and the chambered head 35 to turn, and this results in vertical reciprocation of the shaft 40 upwardly or downwardly, depending on the direction of turn given the handle 48. The speed with which the shaft 40 will reciprocate is determined by the pitch of the coacting threads 38 and 39 and the relative lengths of the parts.

It will be apparent that when the handle is operated in one direction the reciprocating shaft 40 will be drawn upwardly, and the valve 44 will be drawn into sealing relation with respect to the opening 20 in the seat member 19. The rigid character of the valve seat disk 22 permits the valve seat to be placed under substantial compression by the valve member 44 so as to effect a thorough seal and prevent leakage after the valve has been closed. The sealed relationship is made additionally secure by the pressure of fluid acting on the valve in a closing direction. On the other hand, when the handle is turned in the opposite direction, the reciprocating shaft 40 and the valve 44 will be moved downwardly to open the valve, in which case water will be admitted through the aperture of the valve seat body 19, the disk 22, the bore 32 and the slots 31 into chamber 17.

It will be apparent also that the valve 44 does not turn, and there is no turning action between it and the valve seat body member 19, and the only turning action is in a wholly different member, to wit, the valve operating member 37. It will thus be seen that I have provided a valve arrangement whereby wear and tear on washers and valve seat members is practically reduced to a minimum inasmuch as there are no washers or valve seats, which turn on valves nor any valves which turn on washers or valve seats. It is also a fact that by virtue of the arrangement which I have provided, even if the valve is left slightly open, that is, not closed tightly, the pressure of the water will cause the same to close automatically, inasmuch as the natural tendency of the water pressure is to force the valve to closed condition. Apparently this result accrues from the relative play or looseness between the square threads 38 and 39 and the slight play of the head 35 axially of the unit, so that if the valve is not fully closed the water pressure will move the valve the remainder of the distance requisite to effect sealing engagement with the valve seat 19.

An important advantage of the present invention over prior constructions resides in the fact that regardless of how hard the handle 48 may be turned in either direction after the valve has been opened or closed, respectively, the coacting parts of the new and improved valve unit will not become stripped, jammed or damaged. When the valve is in the closed condition seen in Fig. 1, and the valve member has been drawn tightly against the valve seat 19, the interaction of the threads 38 and 39 may cause the rim portion on the inner end of the head 35 to bear tightly against the web 33, thus, in effect, locking the head against further movement relative to the body 26. Likewise, when the valve has been fully opened, the interaction of the threaded parts may move the upper end of the head 35 into abutment with the washer 46, as seen in Fig. 2, and carry the shoulders 39ª on the threaded shaft part 39 into engagement with the web 33, thus substantially locking the parts against further relative movement.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A faucet comprising in combination a body portion having a cylindrical bore provided with a square shoulder, a slidably removable valve unit in said bore comprising a bushing having a web and a valve seat disk having a flare, a valve seat cooperative with said shoulder and having a flare adapted to register with said disk flare, a valve, a reciprocable valve stem having a threaded portion, said threaded portion providing a stop adapted to engage said web, a threaded actuating member for said valve stem having a threaded portion within said bushing, and stem nut means to secure said unit in said bore.

2. A valve unit adapted to be inserted after assembly into a valve housing comprising, in combination, a hollow cylindrical body including a transverse portion intermediate its ends having a coaxial angular aperture and dividing said body into inner and outer chambers, a reciprocable shaft including a shouldered and externally threaded annular part of substantially smaller diameter than said outer chamber and disposed within the latter, means rigid with said annular part including a shank and a part between said shank and said annular part extending through and coacting slidably with the walls of said angular aperture, said shank extending substantially beyond the inner end of said body when said annular part is in abutment with said transverse portion, means comprising a valve seat member abutting the inner end of said body and having an opening coaxial with and of greater diameter than said shank, a valve member on the end of said shank and adapted to coact with said valve seat in sealing relation to said opening, fluid passages opening radially from said inner chamber for the passage from the unit of fluid admitted through said opening, means for axially reciprocating said shaft to carry said valve member into and out of engagement with said seat and including an internally threaded head rotatable within said outer chamber and coacting threadedly with said annular part, means for rotating said head in one direction to draw said valve member into sealing relation with said seat and in the opposite direction to move said valve member into unsealing position, and means coacting with the outer end of said body member for restraining said head against outward movement, whereby when the inner end of said annular part abuts said transverse portion and the outer end of said head abuts said last-mentioned means the parts will be locked against further valve-unseating movement.

3. The combination in a valve unit adapted to be inserted into a valve housing, of a chambered body including a web portion intermediate it ends having a coaxial angular aperture and dividing said body into inner and outer chambers, the exterior walls of said chambers being adapted to engage in slidable relation in the valve housing, means providing a valve seat coacting with the mouth of said inner chamber, a non-rotary reciprocable valve member movable into seating relation with the exterior part of said valve seat, valve reciprocating means embodying parts extending through said valve seat and through said aperture and having a shouldered element axially movable in said outer chamber, said shouldered element cooperating with said web portion to limit unseating movement of said valve member, means for moving said element and said valve extending into said outer chamber and coacting with said element, and means for securing the unit in operative relation within the valve housing.

4. In combination in a valve unit for the purpose described, a chambered body having transversely shouldered means therein spaced from one end and defining the base of a substantial chamber within said body, an apertured valve seat coacting with the opposite end of said body, a valve actuating member including a part coacting with said shouldered means in one relative position in assembly to prevent movement of the member through said opposite end of said body, means extending through said valve seat and having a valve member thereon disposed in non-sealing relation to said valve seat when said part is in coacting relation with said shouldered means, rotatable means extending through said one end of said body and having a head movably coacting with said part when rotated in one direction to carry said valve member into sealing relation with said valve seat and when rotated in the opposite direction to carry said valve member into unsealing position, and means providing a passage for a portion of said rotatable means and cooperating with said one end of said body to enclose the mouth of said chamber, said last-mentioned means providing a stop for preventing outward movement of said head and coacting with said transversely shouldered means to maintain said head and said part against further relative movement after said valve member has been moved to fully open position.

5. A valve unit adapted to be enclosed within a chambered water faucet housing comprising, in combination, a hollow body engageable with the interior of said housing and being radially ported near its inner end to permit passage of water through said inner end and out of the body into the chamber of said housing, means comprising a yieldable valve seat coacting with the inner end of said body and having an aperture therein permitting flow of water into the body, a valve exteriorly engageable with said valve seat to effect a sealing relation over said aperture, a shaft extending from said valve into the interior of said body and having an engagement with the interior of the body permitting axial movement but preventing rotary movement of the shaft and valve, and means engageable with the inner part of the shaft including a rotary member coacting when rotated in one direction to move said valve axially in the direction of water flow into sealing relation with said valve seat and when rotated in the opposite direction to move said valve axially to open position, said rotary member and said shaft being supported relatively loosely within said body to permit slight axial movement of the shaft and valve in addition to the axial movement imparted thereto by rotation of said rotary member in the direction of water flow and in response to the pressure of the water against the valve to seat said valve and prevent leakage into said body when said valve has not been moved into complete sealing relation with said seat by rotary movement of said rotary member.

6. A valve unit for the purpose described comprising, in combination, an elongated hollow body adapted to fit within a valve housing and being radially apertured to permit liquid to flow thereinto through its inner end and to escape laterally therefrom; means within said body intermediate its ends providing an outwardly facing shoulder; a reciprocable and non-rotatable valve shifting member coaxial within said body including an enlarged portion coactive with said shoulder in one relative position of the parts; a shank projecting from said portion and extending beyond the inner end of said body; means extending through the outer end of said body and having a part coacting with said portion for reciprocating the latter; means including a replaceable valve seat abutting said one end of said body and having a fluid aperture through which said shank projects; and a removable valve member secured upon the extremity of said shank and serving to maintain the assembled relationship of the body, the enlarged portion and shank, and the valve seat.

7. A valve unit for the purpose described comprising, in combination, a chambered body adapted to fit within the fluid passageway of a valve housing with its inner portion interposed between the inlet and outlet of the passage, a reciprocable and non-rotatable shifting member coaxial within said body and having an annular shank projecting beyond the inner end of said body, means extending through the opposite end of said body and having a part coacting with said member for reciprocating the latter, said body having radially disposed longitudinal fluid passage slots extending from its inner end a limited distance toward its opposite end, means including a separately formed relatively rigid coaxially apertured disk element coacting with said inner end of said body and bridging the ends of said slots, an axially apertured valve seat of yieldable material exteriorly abutting said disk element, and valve means on the projecting end of said shank serving to retain said valve seat in assembled relation with the unit and in one relative position coacting in fluid sealing relation with said valve seat.

JOHN HOFERLE.